April 14, 1964 J. G. CONSAUL ETAL 3,129,099

METHOD OF GRAVURE REPRODUCTION

Filed Nov. 12, 1958 2 Sheets-Sheet 1

INVENTORS.
JOHN G. CONSAUL.
EDWIN VELTEN.
BY
Ward, Neal, Haselton, Orme & McElhannon
ATTORNEYS.

April 14, 1964 J. G. CONSAUL ETAL 3,129,099

METHOD OF GRAVURE REPRODUCTION

Filed Nov. 12, 1958 2 Sheets-Sheet 2

INVENTORS.
JOHN G. CONSAUL.
EDWIN VELTEN.

BY

Ward, Neal, Haselton, Orme & McElhannon
ATTORNEYS.

3,129,099
Patented Apr. 14, 1964

1

3,129,099
METHOD OF GRAVURE REPRODUCTION

John G. Consaul, Plainfield, and Edwin Velten, North Plainfield, N.J., assignors to Art Color Printing Company, New York, N.Y., and Dunellen, N.J., a corporation of New York Filed Nov. 12, 1958, Ser. No. 773,397
6 Claims. (Cl. 96—43)

This invention relates to photogravure and particularly to methods for producing intaglio printing plates or cylinders for gravure printing.

The conventional process for making gravure printing plates or cylinders involves, in general, the following steps:

(1) An unscreened, continuous tone negative is made in a process camera from the non-transparent or opaque, continuous tone, reflective copy to be reproduced.

(2) An unscreened negative of the printed matter to be reproduced is made.

(3) The foregoing negatives are mounted on lugs in their proper positions and are printed one at a time on a positive film to form a complete positive.

(4) The foregoing complete positive, after retouching, is mounted, wtih other positives if desired, in preparation for printing on a resist.

(5) The resist is put in a printing frame and a line forming gravure screen is printed on the resist.

(6) The resist is removed from the printing frame used for producing the line screen formation, is placed in another printing frame and the positive or positives of step 4 are over-printed on the resist.

(7) The resist is mounted on the printing member such as the rotogravure cylinder.

(8) The resist is developed on the cylinder or printing member.

(9) The printing member or cylinder is etched to provide ink receiving wells in the surface of the member.

Conventionally, negatives and/or positives of continuous tone subjects such as photographs of scenes, people, etc. are prepared separately from the positives and/or negatives of line subjects or type matter so as to provide the desired tone range of the continuous tone subject matter and so as to obtain the desired degree of contrast between the line subjects or type matter and their backgrounds. In some cases due to the differences in quality or contrast of different continuous tone subject matters, it may even be necessary to prepare separate negatives and/or positives for each continuous tone photograph.

It will be apparent from the foregoing that the conventional gravure process requires the services of skilled personnel and is relatively time consuming and expensive. It is an object of the invention to provide a process for producing gravure printing members such as plates for cylinders which is simpler and less expensive to carry out than the conventional gravure process and which will provide results which are as good as the results obtained with the conventional gravure process.

In accordance with the invention, non-transparent or opaque reflective copy in the form in which it is to be reproduced by printing is first prepared. A resist is exposed to the copy through a camera and is then re-exposed to the copy through the camera with the continuous tone portions of the copy masked in such a manner that during the second exposure these portions or areas have no effect on the resist. Either before or after the resist is exposed to the copy, the resist is exposed through a wall forming screen, such as a gravure screen, to produce the lines on the resist which subsequently define the walls of the ink receiving wells or cells of the printing member. Preferably, the exposure of the resist through the wall forming screen takes place while the resist is in the camera in position for exposure to the reflective copy.

2

The various objects and advantages of the invention may be better understood by reference to the following detailed description of the manner in which we now prefer to practice the invention, which detailed description should be considered in conjunction with the accompanying drawings in which.

Figure 2:
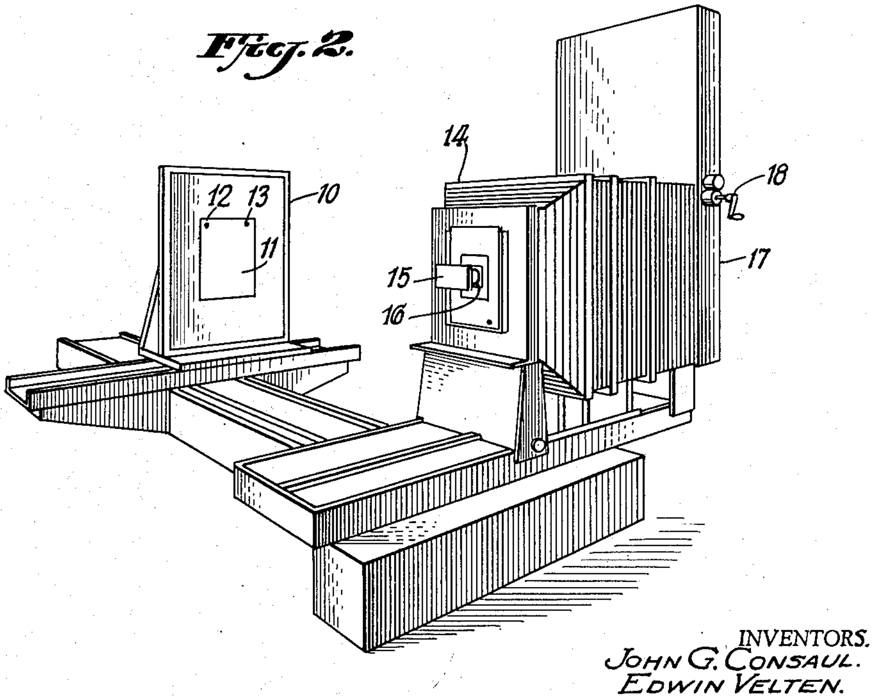
FIG. 2 is a diagrammatic perspective view of a portion of the apparatus illustrated schematically in FIG. 1.

Referring first to FIG. 2, this figure illustrates diagrammatically one known form of apparatus for photographically copying copy mounted in the holder 10. The non-transparent, reflective copy is designated by the numeral 11 and is mounted on lugs 12 and 13. A camera 14 comprising a reversing prism 15 and a lens system 16 projects an image of the copy 11 on photo-sensitive material held by a vacuum back associated with the housing 17. The housing 17 may also contain a half-tone screen which may be placed in front of or removed from in front of the photo-sensitive material by means of a crank 18.

Figures 3, 4:
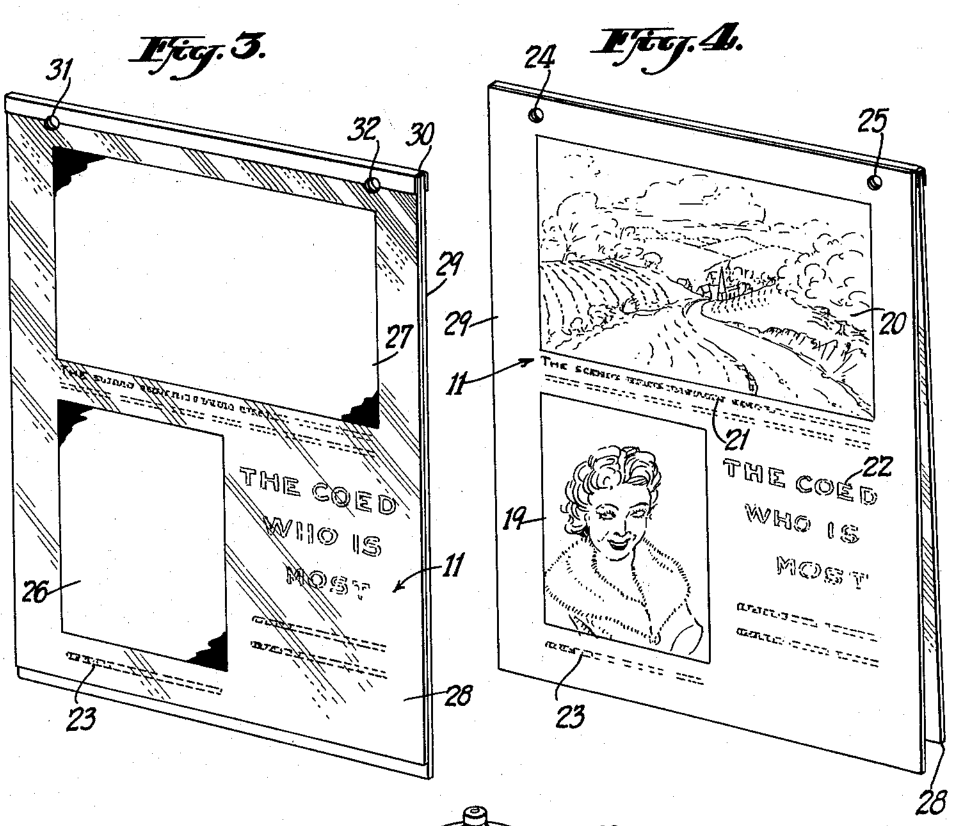
FIG. 3 is a perspective view of a copy masking device which may be used in the practice of the invention, FIG. 3 showing the masks forming a part thereof in place.
FIG. 4 is a perspective view of the device shown in FIG. 3 with the masks thereof removed.

The copy 11 is illustrated in greater detail in FIG. 4. The invention is of particular importance in connection with the preparation of gravure printing members for reproducing copy of the type illustrated in FIG. 4 which comprises continuous tone areas 19 and 20 which may, for example, be photographs, and two-tone areas 21—23 including type matter areas of uniformly high or maximum reflection density on a contrasting background of uniformly low or minimum reflection density. The type matter may, for example, be captions for the continuous tone areas or text associated with such areas. It is important for appearance and reading purposes that there be a high degree of contrast between the type matter and the background. For example, if the copy is black and white copy, the lettering should be "full black" whereas the background should be substantially "full white." The copy 11 may be prepared photographically, but it may also be prepared by mounting photographs, such as the photographs 19 and 20, in the desired positions on paper or paper board 29 having the desired background color and by printing, lettering, or otherwise adding the captions and text adjacent to the photographs 19 and 20. The background paper or board 29 is provided with a pair of lug receiving holes 24 and 25.

During one of the exposures of the resist to the copy 11 in the manner hereinafter described, the complete copy 11 is exposed as illustrated in FIG. 4 so that images of both the continuous tone areas 19 and 20, as well as the two-tone areas 21—23 are projected on the resist. However, during the other exposure of the resist to the copy 11, the continuous tone areas 19 and 20 are masked as illustrated in FIG. 3. The continuous tone areas 19 and 20 may, for example, be masked by means of sheets of black paper 26 and 27 secured to transparent film or sheet 28 which is hingedly secured to the background paper or paper board 29 such as by a tape 30. The clear transparent film or sheet 28 is also provided with a pair of lug receiving holes 31 and 32. It will be understood that it is not necessary to hingedly secured the transparent film or sheet 28 to the background paper or paper board 29. Instead, the transparent sheet 28 with the masking sheets 26 and 27 thereon may be placed over the copy 11 when it is desired to mask the continuous tone areas 19 and 20.

Figure 1:
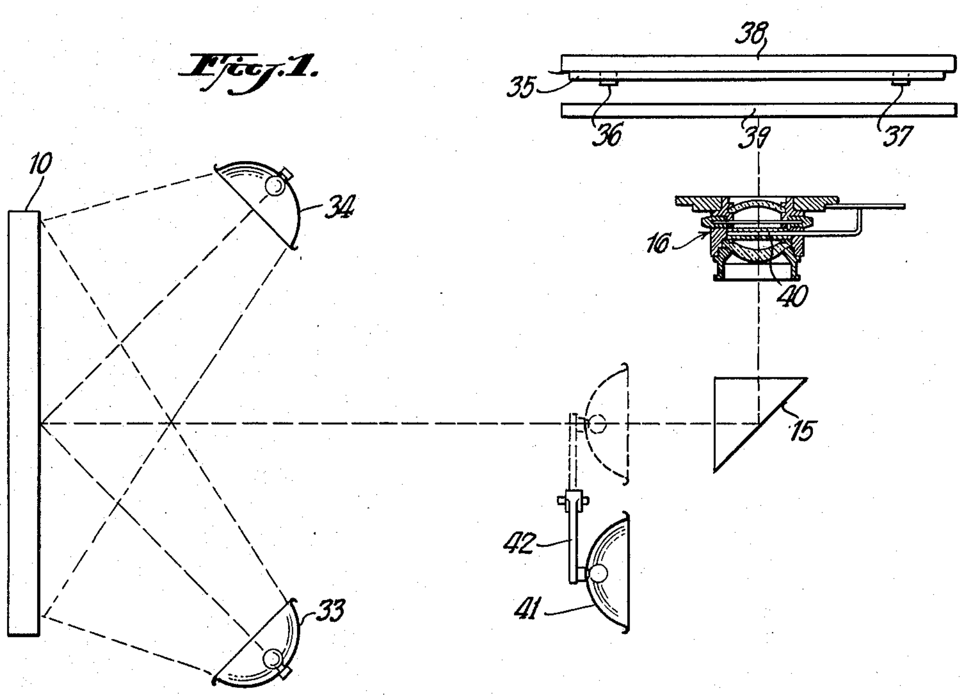
FIG. 1 is a schematic diagram illustrating one form of apparatus for carrying out the method of the invention.

Referring to FIG. 1, the copy 11, which is contained in the copy holder 10, may be uniformly illuminated as required by means of the light sources 33 and 34. In FIG. 1 the camera is illustrated schematically by the reversing prism 15 and the lens system 16, and the light reflected by the copy 11 in the holder 10 is transmitted through the reversing prism 15 and the lens system 16 to the resist 35 mounted on mounting lugs 36 and 37 on a vacuum back or frame 38 producing a reversed image of the copy 11 on the resist 35. During the time that the copy in the holder 10 is illuminated by the sources 33 and 34, the half tone screen 39 is removed from the position shown in FIG. 1, and if a line screen formation is produced on the resist 35 in the manner described hereinafter in connection with FIG. 5, it is unnecessary to employ a half-tone screen 39.

In the preferred embodiment of the invention, the lens system 16 comprises an auxiliary screen device 40 of the type described in our Patent No. 2,703,281 or of the type described in our co-pending application Serial No. 582,150, filed May 2, 1956, now Patent No. 2,920,547. The auxiliary screen device 40 is an opaque disc or plate, e.g., of metal, having a plurality of small light transmitting holes therethrough arranged in two rows which intersect substantially at right angles substantially at the center of the disc. If the line screen formation is produced on the resist 35 in the manner hereinafter described in connection with FIG. 5, the auxiliary screen device 40 may be omitted.

A substantially uniform source of light 41 is mounted on a swivel arm 42 so that the source 41 may be moved from the position shown in full lines in FIG. 1 to the position shown in dotted lines in FIG. 1. In the position shown in dotted lines in FIG. 1, the light source is within about three inches of the prism 15.

The process of the invention comprises three steps as follows:

(1) An exposure of the resist 35 to a uniform light source through a wall forming screen so as to produce a line screen formation photographically on the resist.
(2) An exposure of the resist 35 to the complete reflective copy, that is, including both the continuous tone subject matter and the line subject or type matter as shown in FIG. 4.
(3) As exposure of the resist 35 to the line and type matter on the reflective copy with the continuous tone areas masked as indicated in FIG. 3.

The foregoing steps may be performed in any order. However, it is preferable that steps 2 and 3 follow each other, either step 2 or step 3 being performed first. Step 1 may be performed either before or after steps 2 and 3.

Although other types of resists may be employed, the preferred form of resist is a gravure resist film such as the film sold by E. I. du Pont de Nemours and Co., Parlin, New Jersey, under the name "Rotofilm." After this film is exposed, it is developed and transferred to a gravure cylinder or plate, the transparent film is stripped from the emulsion or resist, the emulsion or resist is developed in accordance with the conventional methods of developing a gravure resist and then the plate or cylinder is etched with acid to produce ink receiving wells or cells in the surface of the plate or cylinder corresponding in size and depth to the tones of the original copy 11. Such processing of the gravure resist film is well known to those skilled in the art.

Figure 5:
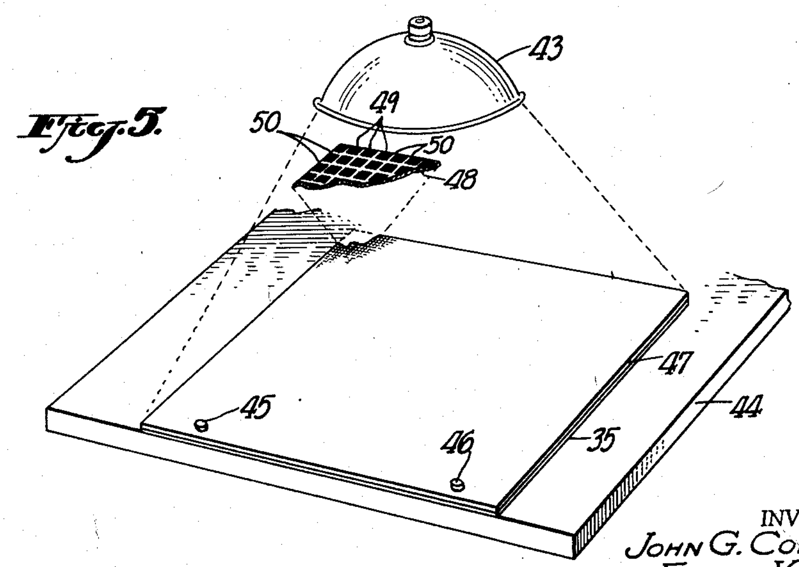
FIG. 5 is a diagrammatic, perspective view illustrating another form of apparatus for producing a screen formation on the resist.

The line screen formation on the resist 35 may be produced either by use of the apparatus shown in FIG. 1 or by use of the apparatus illustrated in FIG. 5.

With the apparatus of FIG. 1, the resist 35 is mounted on the vacuum back 38 using the lugs 36 and 37 for alignment purposes, the conventional half-tone screen 39 is placed in front of the resist 35 in accordance with well known procedures and the auxiliary screen device 40 is placed in the lens assembly 16 so that the rows of holes therein are substantially parallel to the lines of the half-tone screen. The half-tone screen 39 may, for example, be a conventional one to one screen or it may be any other known type half-tone screen. With the prism 15 in place, the light source 41 is moved into the position shown in dotted lines in FIG. 1, and the light source 41 is energized for a time dependent upon the thickness of cell walls desired for the ink wells in the final printing member. For example, if the source 41 includes a No. 1 Photoflood lamp and a reflector, the exposure time may be approximately fifteen seconds, the light intensity at the lens assembly being approximately 1200 foot candles. If desired, the prism 15 may be omitted during this step and the light source 41 may be disposed within about three inches in front of the lens assembly 16.

Alternatively, the half-tone screen 39 may be replaced by a gravure screen in contact with the surface of the resist 35, the auxiliary screen device may be removed, the camera lens opening set to f45 and the resist 35 may be exposed to the light source 41 for five seconds. Of course, the exposure time, the light intensity and the color of the light may be varied in both of the above described line screen forming steps in a manner well known to those skilled in the art.

The apparatus illustrated in FIG. 5 comprises a uniform light source 43 disposed above a mounting board or table 44. The resist 35 is mounted on the board or table 44 and is positioned by means of mounting lugs 45 and 46. A conventional gravure screen 47 is placed over the resist 35 and in contact therewith. A greatly enlarged portion of the screen 47 is illustrated at 48 and it will be noted that the screen 47 comprises a large number of opaque squares 49 separated by transparent portions 50 which portions 50 permit light from the source 43 to pass through the screen 47 to the resist 35. The transparent portions 50 permit the production of a line screen formation or image on the resist 35, which after development and transfer of the resist and transfer to the printing plate or cylinder and subsequent processing corresponds to the walls of the ink receiving cells or wells in the surface of the printing member. The thickness of the cell walls is dependent upon the intensity of the light source 43, and the time of exposure. With an intensity of approximately ten foot candles at the surface of the resist 35, the exposure time with a source producing predominantly green light may be approximately forty-five seconds.

The apparatus illustrated in FIG. 5 and the procedures for producing the line screen formation on the resist by means of a gravure screen are well known to those skilled in the art and need not be described in further detail here. It will also be apparent to those skilled in the art that other methods and apparatus for producing a line screen formation of the desired type on the resist 35 may be employed. However, since it is necessary to place the resist 35 on the vacuum back 38 for the purpose of carrying out the remaining steps of the process of our invention, we prefer to employ one of the processes described above in connection with FIG. 1 for producing the line screen formation on the resist 35.

With the resist 35 in place as indicated in FIG. 1, with the half-tone screen 39 and the auxiliary screen device 40 removed, with the reversing prism 15 in place and with the light source 41 in the position shown in full lines in FIG. 1, the copy 11 is placed in the copy holder 10 with the masks 26 and 27 removed from in front of the copy 11 so that the entire copy is exposed as illustrated in FIG. 4. The light sources 33 and 34 are then energized so that an image of the copy in reversed form is produced on the resist 35. The time of the exposure, the intensity of the light at the copy 11 from the sources 33 and 34 and the lens opening of the camera is dependent upon several factors as is well known to those skilled in the art, but we have found that with a gravure resist film of the type known as "Rotofilm," described above, with a lens opening of *f*45 and with approximately 100 foot candles at the surface of the copy 11, the exposure time with average copy may be approximately one minute plus or minus ten seconds.

The masks 26 and 27 are then put in place so that they cover the continuous tone areas of the copies as illustrated in FIG. 3 and the resist 35 is re-exposed to the copy 11 for a period of time approximately equal to twice the exposure time used with the masks 26 and 27 removed. During the second exposure the lens opening and the light intensity at the surface of the copy 11 may be the same as in the case of the exposure with the masks 26 and 27 removed.

The exposure time, lens opening and light intensity may be varied in a well known manner dependent upon the sensitivity of the resist, the color of the light sources 33 and 34, the properties of the copy 11 and the qualities desired in the resist image. If it is desired to vary the contrast of the image on the resist 35, colored filters such as "Varigam" filters sold by E. I. du Pont de Nemours, above mentioned, may be placed in front of the lens assembly 16. For example, if there is too much contrast in the copy 11, a number 10 violet filter may be employed to soften the image produced on the resist 35, and if there is too little contrast in the copy 11, a number 3 yellow filter may be employed. With normal copy it is unnecessary to employ a filter, but if desired, a number 6 pink filter may be employed with normal copy to provide more pleasing results. When such filters are used, the exposure times for complete copy with 150 foot candles of light at the copy 11 and stop setting of *f*32 may be as follows:

| | Seconds |
|---|---|
| Violet filter | 40 |
| Pink filter | 20 to 25 |
| Yellow filter | 40 |

It will be noted from the foregoing that the resist 35 is exposed at three separate times in carrying out the invention. During one of the exposures, the line screen formation is produced on the resist, during another of the exposures, images of the continuous tone areas and the line subject or type material are produced on the resist 35, and during the third exposure an in-register image of the line subject or type material only is produced on the resist 35. By means of such exposures, the desired cell wall formation is obtained, the continuous tones of the continuous tone areas are preserved on the resist and the desired, relatively high degree of contrast between the line subject or the type material and its background is obtained. After the resist 35 has been so exposed, the resist 35 and the printing member, such as a plate or cylinder, are processed in the conventional manner to produce an intaglio gravure printing member.

Although the process of the invention has been described above as it is used in connection with black and white copy, it will be apparent to those skilled in the art that the process of the invention may be employed in connection with the preparation of the plurality of resists required for multi-color gravure printing.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. The method of producing a gravure resist from non-transparent, reflective copy having continuous tone areas and other areas of uniform reflection density, said resist being adapted for use in making a gravure printing member with said resist in contact with said member, said method comprising exposing said resist to light reflected by said reflective copy for a time sufficent to produce an image of said copy thereon, with the tones of the continuous tone areas in substantially the same relation as the tones of the corresponding areas on said copy, exposing said resist to light reflected by said copy with the continuous tone areas masked for a time sufficient to produce an in-register, increased density image of said other areas of said copy thereon, and exposing said resist to a uniform light source with a line screen means to produce a line screen image thereon and on the areas thereof where the images of both the continuous tone and the other areas are produced.

2. The method of producing a gravure resist from non-transparent, reflective copy having continuous tone areas and other areas of the same tone, said resist being adapted for use in making an intaglio gravure printing member with said resist in contact with said member, said method comprising illuminating said copy and exposing said resist to said illuminated copy for a time sufficient to produce an image of said copy thereon with the tones of the continuous tone area in substantially the same relation as the tones of the corresponding areas on said copy, exposing said resist to said illuminated copy with the continuous tone areas masked for a time sufficient to produce an in-register, increased density image of said other areas of said copy thereon, and exposing said resist to a uniform light source with a line screen means to produce a line screen image thereon and on the areas thereof where the images of both the continuous tone and the other areas are produced.

3. The method of producing a gravure resist from non-transparent, reflective copy having continuous tone areas and other areas containing type matter on a contrasting background, said resist being adapted for use in making a gravure printing member by etching the member with the resist in contact therewith, said method comprising illuminating said copy and exposing said resist to said illuminated copy for a time sufficient to produce an image of said copy thereon with the tones of the continuous tone areas in substantially the same relation as the tones of corresponding areas on said copy, exposing said resist to said illuminated copy, with the continuous tone areas masked, for a time sufficient to produce an in-register, modified image of said other areas of said copy thereon, the contrast between the type matter and the background being increased over that obtained with the first mentioned exposure, and exposing said resist to a uniform light source with a line screen means to produce a line screen image thereon and on the areas thereof where the images of both the continuous tone and the other areas are produced, the time of the last-mentioned exposure being sufficient to produce a line screen image having lines of predetermined width.

4. The method of producing a gravure resist from non-transparent, reflective copy having continuous tone areas and other areas containing type matter on a contrasting background, said resist being adapted for use in making a gravure printing member by etching the member with the resist in contact therewith, said method comprising exposing said resist to a uniform light source through a screen to produce a line screen image thereon, illuminating said copy and exposing said resist to the light reflected by said copy through a camera for a time sufficient to produce an image of both the continuous tone areas and the other areas thereon and superimposed on the area of said resist bearing the line screen image with the tones of the continuous tone areas in a predetermined desired relation and exposing said resist to the light reflected by said copy through said camera, with the continuous tone areas masked, for a time sufficient to produce an increased density, in-register image of said other areas thereon.

5. The method of producing a gravure resist from non-transparent, reflective copy having continuous tone areas and other areas containing type matter on a contrasting background, said resist being adapted for use in making a gravure printing member by etching the member with the resist in contact with said member, said method comprising exposing said resist to a uniform light source through a gravure screen to produce a line screen image thereon, illuminating said copy and with said screen removed, exposing said resist to the light reflected by said copy through a camera for a time sufficient to produce an image of both the continuous tone areas and the other areas thereon and superimposed on the area of said resist bearing the line screen image with the tones of the continuous tone areas in a predetermined desired relation and with said screen removed, exposing said resist to the light reflected by said copy though said camera, with the continuous tone areas masked, for a time sufficient to produce an increased density, in-register image of said other areas thereon.

6. The method of producing a gravure resist from non-transparent, reflective copy having continuous tone areas and other areas of uniform reflection density, said resist being adapted for use in making an intaglio gravure printing member by etching the member with a resist in contact with said member, said method comprising exposing said resist to a uniform light source through a half-tone screen and an auxiliary screen device comprising an opaque member having a plurality of light-transmitting holes therethrough arranged in two rows which intersect substantially at right angles, to thereby produce a line screen image on said resist, the lines of the image corresponding to the walls of ink receiving wells to be formed in the printing member, illuminating said copy and exposing said resist to the light reflected by said copy through a camera with said screen removed for a time sufficient to produce an image of the continuous tone areas and the other areas thereon and superimposed on the area of said resist bearing the line screen image with the tones of the continuous tone areas in substantially the same relation as the tones of the corresponding areas on said copy and exposing said resist to said illuminated copy through said camera with said screen removed and with said continuous tone areas of said copy masked, for a time sufficient to produce an increased density, in-register image of said other areas thereon.

References Cited in the file of this patent

UNITED STATES PATENTS

| | | |
|---|---|---|
| 1,581,012 | Philippe et al. | Apr. 13, 1926 |
| 1,841,274 | Ballard | Jan. 12, 1932 |
| 1,909,282 | Kirsch | May 16, 1933 |
| 2,048,876 | Marx | July 28, 1936 |
| 2,060,640 | Shaw | Nov. 10, 1936 |
| 2,370,461 | Heberlein et al. | Feb. 27, 1945 |
| 2,665,984 | Tourneau | Jan. 12, 1954 |
| 2,708,626 | Yule et al. | May 17, 1955 |
| 2,914,406 | Consaul et al. | Nov. 24, 1959 |

OTHER REFERENCES

Flader: "Modern Photoengraving," Modern Photoengraving Publishers, Chicago, Ill., page 113 (1958). (Copy in Scientific Library.)

Hackleman: "Commercial Engraving and Printing," pages 303–4, Commercial Engraving Publishing Co., Indianapolis, Ind. (1924). (Copy in Scientific Library.)